Patented Mar. 2, 1926.

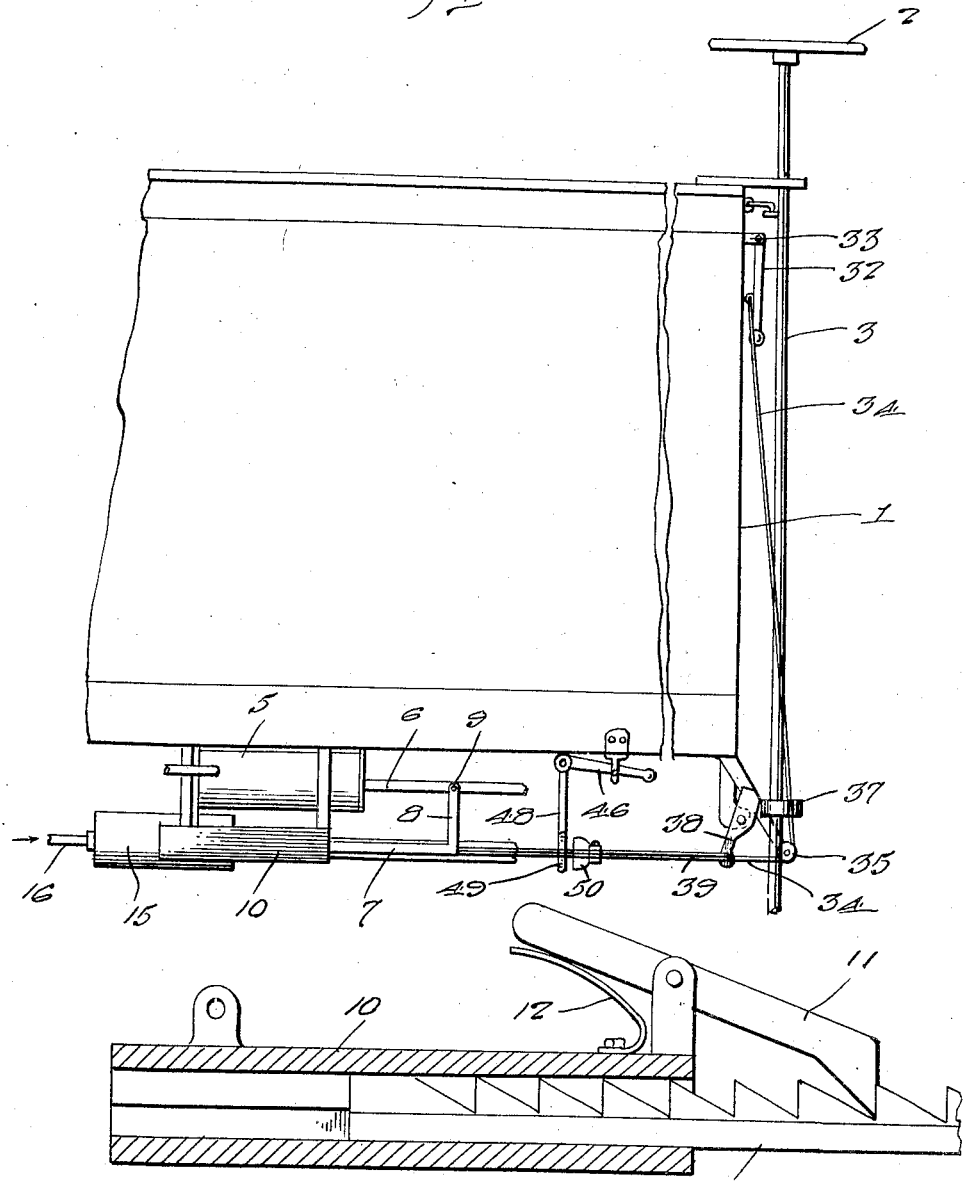

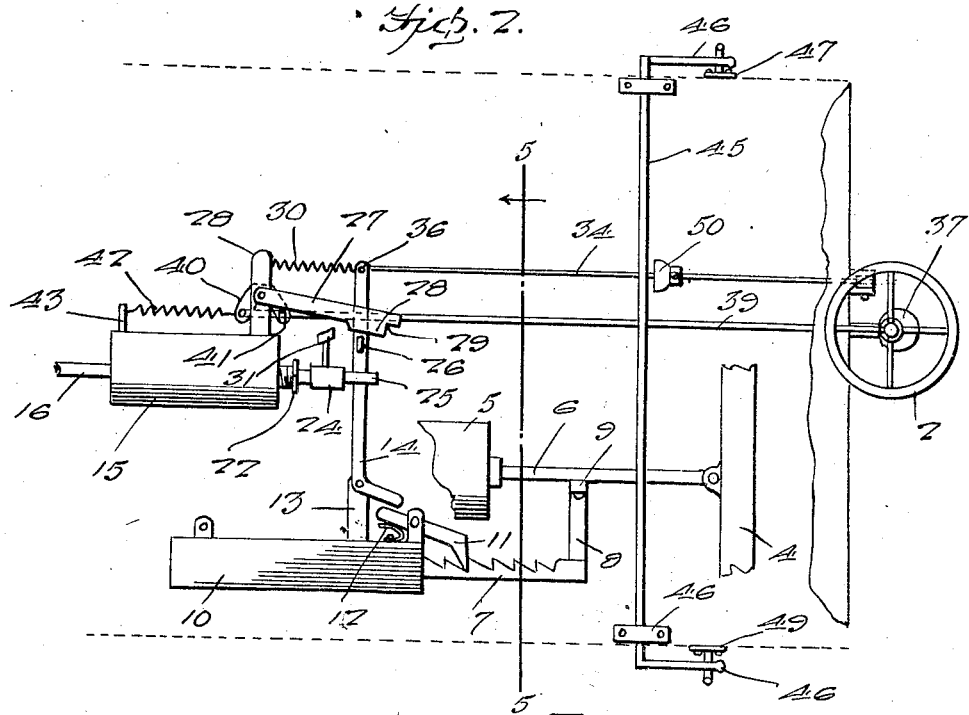

1,574,921

UNITED STATES PATENT OFFICE.

HERBERT W. NELSON, OF BUHL, MINNESOTA.

BRAKE LOCK FOR RAILWAY CARS.

Application filed March 14, 1925. Serial No. 15,538.

*To all whom it may concern:*

Be it known that I, HERBERT W. NELSON, a citizen of the United States, residing at Buhl, in the county of St. Louis and State of Minnesota, have invented certain new and useful Improvements in Brake Locks for Railway Cars, of which the following is a specification.

This invention relates to means for locking the brakes on railway cars, in set position independently of the operation of the brake cylinders.

An object of this invention resides in providing a brake locking structure for railway car brakes operable to automatically lock the brakes in set position, upon the failure of pressure in the train line due to a break or excessive leakage or following the uncoupling of a car from the braking system of a train, which permits the pressure in the system on the car to gradually become exhausted. A further object of the invention, in addition to the above, includes the provision of a means for locking the brakes in set position, and a plurality of operating devices for releasing said means either manually or by the building up of air pressure in the train line, so that the normal operation of the brakes may be effected under normal operating conditions of the car.

A further object of the invention is to provide releasing means for the locking means operable from several different positions on the car, so that a trainman on top of the car operating the hand brake may release the locking device, a trainman coupling two cars may release the locking device following the coupling of the cars through the operation of suitable releasing means at the side of the car and the provision of additional means operable by air pressure, to release the locking device, when the normal air pressure is maintained in the air brake system of a car.

Other objects and improvements in the details of construction and arrangement of parts are particularly pointed out in the following detailed description and in the claims directed to a preferred form of the invention, it being understood, however, that various modifications may be made in the construction and arrangement of these parts which are within the scope of the invention as herein described and claimed.

In the drawings, forming part of this application:

Figure 1 is a side elevational view of one end portion of the car, equipped with the improved locking device, forming the subject matter of the present invention.

Figure 2 is a plan view of the invention as applied to the car, showing the car in dotted lines, and showing portions of the brake equipment of the car broken away.

Figure 3 is a vertical sectional view of the air operated releasing device for the brake locking mechanism and associated parts.

Figure 4 is an enlarged detail plan view of the brake locking mechanism, showing the guide for the rack bar in section.

Figure 5 is a sectional view, taken on the line 5—5 of Figure 2.

The body of a railway car, such as a freight car or the like, is indicated at 1, having the usual hand brake wheel 2 mounted on the rotatable hand brake shaft 3, in a well-known manner, for connection and operation of the brake beam 4, which operates the brake of a car, the connections between the hand brake shaft 3 and the beam 4, which are well known in the art, not being illustrated. The usual brake cylinders, forming part of the air brake mechanism on the car is indicated at 5, which is connected by a piston rod 6 to the brake beam 4, as illustrated in Figure 2 of the drawing, so that through the proper control of air pressure in the brake cylinder 5, the brakes may be operated or released. This described structure forms the usual brake operating mechanism found on railway cars, and forms no part of the present invention.

A rack bar 7 is provided with an angular bent end 8, which is connected, at 9, with the piston rod 6 of the brake beam operating mechanism. A suitable guide member 10 is mounted on the bottom of the car body 1, for receiving and slidably guiding the rack bar 7 in its movement, said guide member also supporting a latch 11, normally moved into engagement with the rack bar 7, through the medium of a leaf spring 12, mounted as illustrated particularly in Figure 4, on the guide member 10. This guide member is also provided with a projection 13, on which is mounted a releasing lever 14, for the latch 11, which is of substantially L-shape, having a short leg adapted for engagement with the latch and a substantially long leg adapted to receive suitable connections from operating devices, which will be presently described.

At a suitable position, on the bottom of the car body, there is mounted a cylinder 15, connected to the train pipe pressure supply line to the pipe 16, for receiving a supply of air from the train line for operating the piston 17, reciprocable through a limited movement in the cylinder 15. One end of the piston 17 is beveled as at 18, for seating against the beveled shoulder 19 in the cylinder, while the remaining portion of the cylinder houses a coil spring 20, interposed between one end of the piston 17 and a plate 21, carried by the threaded sleeve 22 adjustable in the closed end of the cylinder 15. This adjustment of the plate 21 is adapted to vary the tension of the spring 20, for controlling the degree of pressure necessary to operate the piston 17 to hold the same against the shoulder 19. The piston rod 23 connected with the piston 17 extends through the sleeve 22 and is provided on the end portion with a fitting 24, having a forked end 25, adapted to engage about the opposite sides of the lever 14, so that in the projection of the fitting 24 through the operation of the piston 17 by the air pressure in the train line, the releasing lever will engage the pawl 11 and move the same out of the path of movement for cooperation with the rack teeth on the rack bar 7, so that the brake cylinder 5 will have free control of the brakes of the car, through the operation of the brake beam 4. A projection 26 extends laterally from the releasing lever 14 above the point of engagement of the portion 25 therewith, and is adapted for cooperation with a latch 27, pivotally mounted on the standard 28 projecting from the cylinder 15, near the closed end portion thereof. This latch has a bearing portion 28 adapted to ride on the projection 26 and a notch 29 in which the projection 26 is adapted to seat so that the latch will lock the releasing lever in position to hold the pawl 11 out of operative engagement with the rack 7, to permit free operation of the brakes by the brake cylinders. A tension spring 30 connected with the end of the releasing lever 14, and the end of the standard 28, normally tends to operate said lever 14, for moving it into the position shown in Figure 2, to release the latch 11, so that it may cooperate with the rack bar 7. The fitting 24 is provided with a latch operating member 31, projecting laterally therefrom, as illustrated in Figures 2 and 3, so that the forward movement of the fitting under the operation of the piston by the air pressure from the train line will engage the bearing face of the latch 28 and move the same out of engagement with the projection 26, to permit free operation of the releasing lever and to release the same from locked position and permit cooperation of the pawl 11 with the rack bar.

It will be seen from this construction that when the normal pressure is carried in the train line pipe for the operation of the brakes on a car, through controlling the operation of a brake cylinder 5, the piston will be maintained in projected position under the air pressure against the piston 17, which which will hold the releasing lever in engagement with the pawl 11 and hold said pawl out of cooperative engagement with the rack bar 7, so that free operation of the brake beam may be effected. If, however, a break should occur in the train line pipe, due to the uncoupling of connections, which permits an exhaust of the air in the system on any car, such as a car equipped with this invention, it will be seen that the releasing lever will be permitted to release the pawl for engagement with the rack bar 11, so that the release of pressure in the train line will operate the triple valve of the car, for operating the brake cylinder to apply the brake, and that the rack bar 7 will cooperate with the latch 11 and lock the brakes in set position, so that upon the leakage of the air from the brake cylinder, the brakes will not be released. This construction is also of advantage, where a car is coupled in a long train, going down a long grade, where it frequently happens that the air pressure, due to the constant control of the brake is exhausted to a substantially low pressure, so that the cars will not be fed with the proper pressure of air for operating the brake, and which frequently results in the lack of efficient braking of the train, causing the same to run away. This invention will overcome this disadvantage, in that it will lock the brakes in set position on a car, after the pressure in a train line is reduced below a predetermined pressure, so that the brakes will not be released, until pressure is built up to such predetermined pressure during which time the brakes will operate efficiently to provide a desired braking action on the train.

When the car equipped with this invention is being shifted about a yard or the like, or in the making up of a train, it is necessary to control the brakes of the car by the hand wheel 2, and in order to permit the operation of this invention and the release of the pawl 11 from cooperation with the rack bar 7 to permit release of the brake, it has been found necessary to provide means operable from a point adjacent the hand wheel for the releasing lever 14. This includes a handle 32, pivotally mounted on a bracket 33, secured to the end of a car, adjacent the brake rod 3, so as to be in convenient position for operation by a trainman operating the brake wheel 2 and through the cable connection 34 extending over the pulley 35, carried at the bottom end of the car is adapted to operate the releasing lever through the connection of said cable with the end portion at 36. In this connection, it will be noted that this invention prevents the use of the usual pawl and ratchet on the brake rod 3, as the pawl 11 and ratchet bar 7 will maintain the brakes in locked position when applied, through the operation of the hand wheel 2, and that the same are readily released by the operation of the hand lever 32. A cam 37 is mounted on the lower end of the brake rod 3 and is adapted to operate a lever 38, pivotally mounted on a bracket carried by the bottom of the car, and having a connection 39, with a bell crank lever 40, pivotally mounted on the same pivot as the latch member 27. The free end of the bell crank lever is provided with a lateral projection 41, extending under the latch member 27, and in the operation of the hand wheel 2, the latch member will be released from engagement with the projection 26, so that the bell crank lever will operate the latch member to release the releasing lever 14, in order to permit the release of the pawl 11 so that the same may cooperate with the rack bar 7 in order to permit the locking of the brakes in set position. A coil spring 42 is connected with a projection 43, on one end of the cylinder, and the end of the bell crank lever 40, with which the connection 39 is secured, so as to operate said bell crank lever and the lever 38 to engage the cam 37 on the brake rod 3.

From this construction, it will be seen that full control of the invention is provided for, by a trainman operating the hand wheel 2, during the shifting of cars or the making up of trains.

In the making up of trains, it is also desirable to provide means for operating the releasing lever 14 from the sides of the car by a trainman standing on the ground alongside of the track, who is in position to couple the air hose and make the necessary connections when coupling cars together, to form a train, and for this purpose, an operating rod 45 is mounted in suitable bearings 46, and extends transversely under the bottom of the car, as illustrated in Figures 1 and 2, and at opposite ends is provided with laterally extending portions forming operating handles 46. Suitable brackets 47 are mounted on the sides of the car, adjacent the bottom edge, in which the operating handles 46 are adapted to rest, when not in use.

The central portion of the operating rod 41 is provided with a depending projection 48, having an eyed end 49 receiving the operating cables 34 connected with the releasing lever 14, which is adapted to engage a stop 50 mounted on the cable 34, so that the releasing lever 14 may be operated to operate the pawl 11, to move it into inoperative position with respect to the rack bar 7, to permit release of the car brakes from set position. For this purpose, the handle is moved in an upward direction, so that the eyed end 49 will engage the stop 50 for effecting the movement of the releasing lever 14 in an operative manner. From this construction, it should be seen that when a car is being coupled for the making up of a train, the brakes are usually applied on the same, and that the trainman at the side of the car after coupling the car in the usual manner, in making up of the train, operates the handles 46 at the side of the car which will operate the releasing lever 14 to release car brakes.

From the foregoing description, it should be readily appreciated that a brake setting mechanism has been provided, which will operate automatically, to lock the brakes in set position, and that suitable control means is provided for releasing the brake setting mechanism under normal operating conditions, for permitting the operation of the cars of the train equipped therewith.

What is claimed is:

1. A device of the class described comprising a rack bar connected with the brake mechanism of the car, means cooperating with said rack bar normally adapted upon the movement of the brake mechanism toward set position to hold said bar and brake mechanism to prevent release of the brakes, pressure operated means adapted to control the rack bar locking means under predetermined conditions, and manually operated means for controlling said rack bar locking means independently of said pressure operated means.

2. A device of the class described comprising a rack bar connected to the brake equipment of a railway car for movement therewith during the setting of the brakes, locking means adapted for cooperation with said rack bar to lock the same in position, when the brakes are set by said brake equipment of the car and prevent release thereof, pressure operated means for controlling said locking means, manually operated means for controlling said locking means independently of said pressure operated means, means for holding said locking means in inoperative position, and means carried by the pressure operated means and the manually operated means for releasing the means for rendering said locking means inoperative.

3. A device of the class described comprising a rack bar connected to the brake mechanism of a railway car, and operable therewith in the application of a brake, means cooperating with said rack bar to lock the brake mechanism in applied position, a pressure operated reciprocable member for controlling said rack bar locking means to release said means from engagement with said rack bar, said pressure operating means being controlled by the operating pressure to said brake mechanism under predetermined conditions, means for rendering the said rack bar locking means inoperative, means carried by the reciprocable pressure operated means for releasing the means rendering said locking means inoperative, and manually operated means for releasing said locking means from the rack bar, said means also controlling and releasing the means rendering the locking means inoperative.

In testimony whereof I affix my signature.

HERBERT W. NELSON.